United States Patent
Merl et al.

(10) Patent No.: US 10,503,584 B1
(45) Date of Patent: Dec. 10, 2019

(54) LOW COST, HARDENED SINGLE BOARD COMPUTER FOR COMMAND AND DATA HANDLING

(71) Applicant: LOS ALAMOS NATIONAL SECURITY, LLC, Los Alamos, NM (US)

(72) Inventors: Robert Bernard Merl, Los Alamos, NM (US); Paul Stanley Graham, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 22 days.

(21) Appl. No.: 15/630,619

(22) Filed: Jun. 22, 2017

Related U.S. Application Data

(60) Provisional application No. 62/353,995, filed on Jun. 23, 2016.

(51) Int. Cl.
*G06F 11/10* (2006.01)

(52) U.S. Cl.
CPC ...... *G06F 11/1008* (2013.01); *G06F 11/1004* (2013.01)

(58) Field of Classification Search
CPC .................. G06F 11/1008; G06F 11/1004
See application file for complete search history.

(56) References Cited

U.S. PATENT DOCUMENTS

| | | | | |
|---|---|---|---|---|
| 7,859,292 B1* | 12/2010 | Shuler, Jr. | .......... | H03K 19/0033 326/11 |
| 8,014,184 B1* | 9/2011 | Lesea | ............... | H03K 19/00338 365/154 |
| 8,332,722 B1* | 12/2012 | Vera Rojas | ...... | H03K 19/17768 714/752 |
| 9,367,488 B1* | 6/2016 | Ardalan | .................. | G06F 13/00 |
| 2005/0027409 A1* | 2/2005 | Marshall | ............. | G06F 15/7867 701/13 |
| 2006/0036909 A1* | 2/2006 | VanBuren | ............. | G06F 11/106 714/15 |
| 2008/0052436 A1* | 2/2008 | Sharma | ............... | G06F 13/4063 710/301 |

OTHER PUBLICATIONS

Robert Merl and Paul Graham, "MicroTCA for Space Applications," ISBN 978-1-4673-7676-1/16, Published in Aerospace Conference © 2016 IEEE, 8 pages.

* cited by examiner

*Primary Examiner* — Kyle Vallecillo
(74) *Attorney, Agent, or Firm* — Lewis Roca Rothgerber Christie LLP

(57) ABSTRACT

A radiation hardened single board computer (SBC) includes a processor; static random-access memory (SRAM); non-volatile memory; a field programmable gate array (FPGA); and board-level physical layer interfaces.

20 Claims, 3 Drawing Sheets

LOW COST, HARDENED SINGLE BOARD COMPUTER FOR COMMAND AND DATA HANDLING

CROSS-REFERENCE TO RELATED APPLICATION(S)

The present application claims priority to and the benefit of U.S. Provisional Application No. 62/353,995, filed Jun. 23, 2016, entitled "LOW COST, HARDENED SINGLE BOARD COMPUTER FOR COMMAND AND DATA HANDLING", the entire content of which is incorporated herein by reference.

STATEMENT REGARDING FEDERALLY SPONSORED RESEARCH OR DEVELOPMENT

The United States government has rights in this invention pursuant to Contract No. DE-AC52-06NA25396 between the United States Department of Energy and Los Alamos National Security, LLC for the operation of Los Alamos National Laboratory.

BACKGROUND

1. Field

Embodiments of the present invention relate to hardened single board computers for command and data handling.

2. Description of the Related Art

Radiation hardened processor boards for space flight tend to be large, expensive, and consume relatively high amounts of power.

SUMMARY

Embodiments of the present invention include a single-board computer (SBC) for deployment in space-flight applications. The SBC may meet the command- and data-handling requirements for missions requiring true space-grade radiation hardness and fault tolerance, for example, exceeding those that are typical in CubeSat and SmallSat applications. The SBC according to embodiments of the present invention may have a substantially lower cost, lower power, and smaller form factor than typical space-grade solutions presently available. The SBC according to embodiments of the present invention may use the MicroTCA standard, which is smaller than common 6U-sized solutions but still allows interoperability with a diverse ecosystem of commercial development equipment. The SBC according to embodiments of the present invention may use Qualified Manufactures List—Class V (QMLV) or Class-S parts with total-ionizing-dose tolerance appropriate for deployment on long-term missions in earth orbit applications (e.g., medium Earth orbit (MEO) and geosynchronous Earth orbit (GEO) environments).

According to an embodiment of the present invention, a radiation hardened single board computer (SBC) includes: a processor; static random-access memory (SRAM); non-volatile memory; a field programmable gate array (FPGA); and board-level physical layer interfaces.

The processor may be an application specific integrated circuit.

The SBC may be configured to interface with one or more sensor boards via the board-level physical layer interfaces.

The FPGA may be configured to perform automated error detection and correction for errors found in a plurality of SRAM programming memory of FPGAs of the sensor boards due to radiation induced single event effects.

The FPGA may include physical layer support for: high-speed serial interfaces; Low-Voltage Differential Signaling (LVDS) interfaces; an Inter-IC (I2C) interface; SpaceWire; and Joint Test Action Group (JTAG) interfaces.

The FPGA may include custom hardware co-processing functions to reduce a load on a processor ASIC.

The FPGA may be configured to manage entire block reads and writes for flash memory.

The SBC may be a payload processor for a set of instruments in Earth orbit applications.

The SBC may be configured to consume 6.6 W or less.

The SBC may be configured to meet MicroTCA standards.

According to an embodiment of the present invention, a field programmable gate array (FPGA) of a radiation hardened single board computer (SBC) is configured to provide a platform for custom hardware co-processing functions to reduce a load on a processor ASIC of the SBC. The FPGA includes physical layer support for interfaces, wherein the SBC is configured to interface with a sensor board, and wherein the FPGA is configured to perform automated error detection and correction for errors found in static random access memory (SRAM) configuration memory of an FPGA of the sensor board.

The physical layer support may include support for: high-speed serial interfaces; Low-Voltage Differential Signaling (LVDS) interfaces; an Inter-IC (I2C) interface; SpaceWire; and Joint Test Action Group (JTAG) interfaces.

The FPGA may be configured to manage entire block reads and writes for flash memory.

Automated error detection and correction my include: detecting, at the FPGA, an error in the programming memory of the SRAM of the FPGA of the sensor board; interrupting a processor; and fixing, by the processor, the error in the programming memory of the SRAM of the FPGA of the sensor board.

Automated error detection and correction may further include scrubbing, by the FPGA, the SRAM based FPGA of the sensor board by scanning the programming memory of the SRAM of the FPGA of the sensor board and comparing results of the scan with a set of local checksums.

The FPGA may be configured to perform the scrubbing autonomously without disturbing the processor.

Fixing the error may include using a known good copy of the programming memory from a deep radiation hardened memory on the SBC.

According to an embodiment of the present invention, a method of providing error detection and correction by a field programmable gate array (FPGA) and processor of a radiation hardened single board computer (SBC), the error detection and correction being for an instrument board is provided. The method includes detecting, at the FPGA, an error in a configuration memory of the instrument board; interrupting a processor; and fixing, by the processor, the error in the configuration memory of the instrument board.

The method may further include scrubbing, by the FPGA, a SRAM based FPGA on the instrument board by scanning the configuration memory of the instrument board and comparing results of the scan with a set of local checksums.

The FPGA may perform the scrubbing autonomously without disturbing the processor.

Fixing the error may include using a known good copy of the configuration memory from a deep radiation hardened memory on the SBC.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
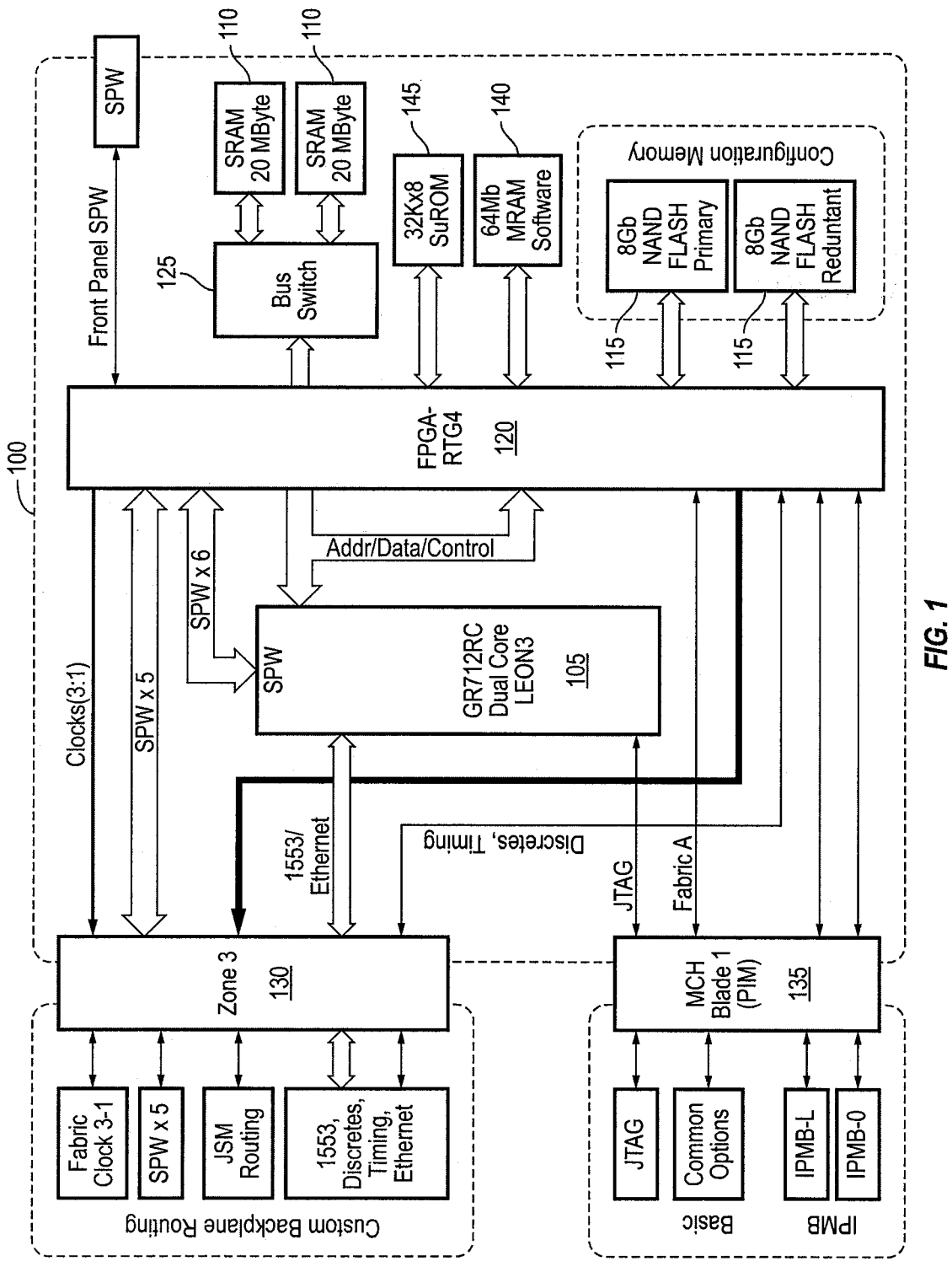
FIG. 1 is an architectural block diagram of a single board computer (SBC) according to an embodiment of the present invention.

Embodiments of the present invention include a single-board computer (SBC) for deployment in space-flight applications. The SBC may meet the command- and data-handling requirements for missions requiring true space-grade radiation hardness and fault tolerance, for example, exceeding those that are typical in CubeSat and SmallSat applications. The SBC according to embodiments of the present invention may have a substantially lower cost, lower power, and smaller form factor than typical space-grade solutions presently available. The SBC according to embodiments of the present invention may use the MicroTCA standard, which is smaller than common 6U-sized solutions but still allows interoperability with a diverse ecosystem of commercial development equipment. The SBC according to embodiments of the present invention may use QMLV or Class-S parts with total-ionizing-dose tolerance appropriate for deployment on long-term missions in earth orbit applications (e.g., medium Earth orbit (MEO) and geosynchronous Earth orbit (GEO) environments).

The Single-Board Computer (SBC) according to embodiments of the present invention may function as a payload processor for a set of instruments in earth orbit applications (e.g., MEO and GEO applications). Previous similar computers have used 6U-sized (160 mm×233 mm) CompactPCI (cPCI) boards for the command- and data-handling function. Embodiments of the present invention may use a smaller form factor of MicroTCA and a lower power computing architecture.

Instrument systems for use on satellites and in other space applications often include of a suite of sensor boards connected through a backplane to a processor board. The processor board is responsible for configuring the sensor boards, reading data from the sensor boards, and sending that data in a packaged format to the space-vehicle host. The processor board may also accept commands from the spacecraft and send state-of-health information to the spacecraft.

Traditional designs are based on the 6U CompactPCI (cPCI) form factor. CompactPCI uses a synchronous parallel bus architecture that is limited to 66 MHz. While this is adequate for some applications, other applications may use high-speed serial protocols. For example, recent advances in technology are bringing multi-gigabit SerDes (Serializer Deserializer) to space-grade components.

MicroTCA is shorthand for the Micro Telecommunications Computing Architecture. It is part of a family of standards under the Advanced Telecommunication Computing Architecture (ATCA) and is maintained by the PCI Industrial Manufacturers Group (PICMG). ATCA systems support the use of Advanced Mezzanine Cards (AMCs) that reside on carrier cards. MicroTCA is a compact adaptation of ATCA that does away with carrier cards and allows users to insert AMCs directly into backplanes. AMCs come in several form factors. Some embodiments of the present invention use the "double-wide" or "midsize" standards for MicroTCA or AMCs. The card pitch in both cPCI and MicroTCA-midsize is 0.8 inches, but the area of the MicroTCA card is 38 in$^2$ as opposed to 57 in$^2$ for 6U cPCI. Double-wide refers to the area and midsize refers to the pitch of the card.

The smaller size of MicroTCA, when applied to the entire package of instruments and not just the SBC (e.g., processor or payload processor), may allow for a reduction in the weight of the overall payload. Further, typical SBC designs consume much more than the approximately 6 W (e.g., 6.6 W or about 6.6 W or less) consumed for some embodiments of the present invention. The SBC may be referred to herein as a processor. Further, according to embodiments of the present invention, the SBC is a payload processor, and as such, the SBC may be referred to herein as a payload processor.

Figure 2:
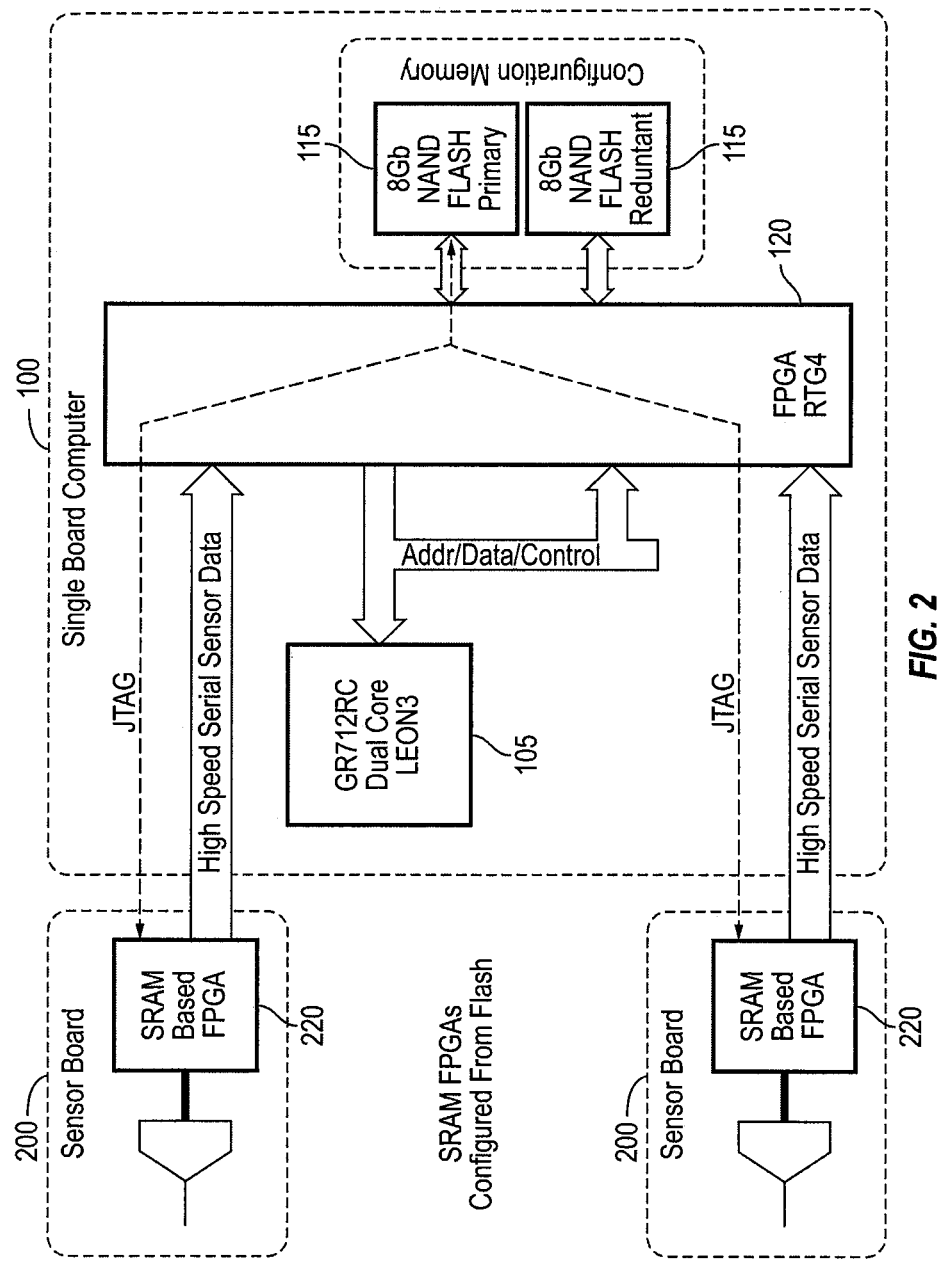
FIG. 2 is a sensor board configuration diagram using the single board computer (SBC) according to an embodiment of the present invention.

FIG. 1 is an architectural block diagram of a single board computer (SBC) according to an embodiment of the present invention. FIG. 2 is a sensor board configuration diagram showing a single board computer (SBC) and other modules according to an embodiment of the present invention. FIG. 2 is a diagram showing how the other modules beside the SBC in the overall system that use non-radiation hardened or SRAM FPGAs can be scrubbed for radiation induced errors and those errors can be corrected using the SBC.

Referring to FIGS. 1 and 2, the SBC 100 according to embodiments of the present invention may include a processor 105 (e.g., an application-specific integrated circuit (ASIC) or application-specific processor), static random-access memory 110 (SRAM), non-volatile memory (e.g., NAND flash) 115, a field-programmable gate array (FPGA) 120, and board-level physical layer interfaces.

Figure 3:
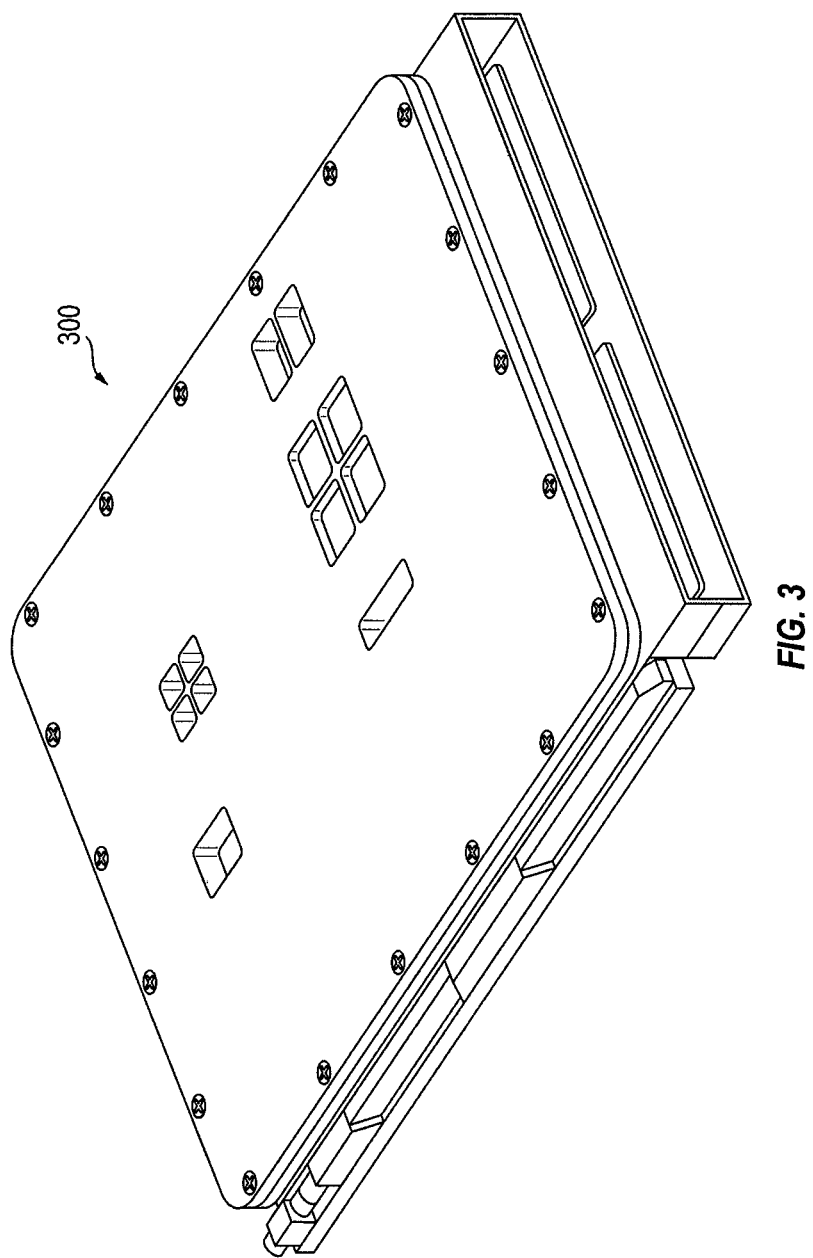
FIG. 3 is a perspective view of a conduction cooled enclosure for a single board computer (SBC) according to an embodiment of the present invention.

Cooling and mechanical hardness of the SBC 100 may be achieved with a custom conduction-cooled frame that fits around the MicroTCA-form-factor printed circuit board (see FIG. 3).

Referring again to FIGS. 1 and 2, the SBC 100 according to embodiments of the present invention may use a space-quality dual-core processor ASIC 105. The SBC 100 according to embodiments of the present invention may meet the command- and data-handling requirements of medium-sized missions.

The SBC 100 according to embodiments of the present invention may consume only about 6 W (e.g., 6.6 W or about 6.6 W or less) and may measure less than 7 inches×6 inches, the SBC 100 may support 9-gigabit/s class bidirectional SerDes links, 6 SpaceWire ports, redundant MIL-STD-1553B ports, 32 Mbytes of EDAC protected SRAM, 2 GBytes of nonvolatile memory, and may support 200 MFLOPS operation. This SBC may be capable of communicating directly with a host space vehicle over both MIL-STD-1553B and SpaceWire interfaces.

The SBC 100 according to embodiments of the present invention may also support serial interfaces on its backplane connectors. The serial interfaces may include Inter-IC (I2C) and multi-gigabit SerDes-based protocols. The design may also support discrete Input/Output (I/O) interfaces that can be connected to other boards on the backplane or to the space vehicle. The SBC 100 may accept space-vehicle clocks that can be used for system timing.

The SBC 100 may be mapped onto the MicroTCA standard and may perform as a simple MicroTCA Carrier Hub (MCH) or as a standard AMC card.

The processor ASIC 105 may execute flight software and may be at the top of the command- and data-handling control hierarchy. The processor ASIC 105 may occupy the top level of control for this board. The processor ASIC 105 may boot from code stored in the external non-volatile memories 140 and 145, transfer flight software to SRAM 110, and then begin execution of flight software from SRAM 110.

The processor ASIC 105 may have built-in hardware support for SpaceWire, error detection and correction (EDAC) on external memories, and the MIL-STD-1553B encoding and decoding standards.

The processor ASIC 105 may be based on a dual-core LEON3 processor application-specific integrated circuit (ASIC).

For example, the ASIC 105 may be the Cobham Gaisler GR712RC™, which is space qualified, radiation tolerant to 300 krad, and fault tolerant. The GR712RC is manufactured on 180-nm CMOS. It has internal Advanced Microcontroller Bus Architecture (AMBA) buses with peripherals that support external memory, Joint Test Action Group (JTAG)-based debugging, 6 SpaceWire ports, 10/100 Ethernet, and MIL-STD-1553B. The GR712RC has a floating-point unit for each of its two cores. The GR712RC may be clocked for both cores at 100 MHz, which yields a 200 MFLOP (floating-point operations per second) theoretical maximum performance. The processor's internal and external memories may be protected from single-event radiation effects with error detection and correction (EDAC) circuitry. The processor 105 may be capable of running VxWorks™, RTEMS, and/or Linux.

The highest performance memories in this system may be the two 20-Mbyte SRAMs 110. The SRAMs 110 may be organized with a bus width that is 40-bits wide instead of 32, which is optimized for the error detection and correction (EDAC) hardware built into the processor ASIC 105. The processor 105 may read or write 32 bits of data, plus another 7 EDAC bits, in a single operation to the SRAMs. Since 7 EDAC bits may be used to cover a 32-bit data word for single-error correction and double-error detection (SECDED)—for a total of 39 bits, one bit in every 40-bit word may be unused. After the EDAC bits are accounted for, the usable SRAM 110 memory space is 32 Mbytes of protected memory.

To reduce capacitive bus loading and improve system timing, a bus switch 125 may be added to the design between the processor ASIC 105 and the two SRAM 110 memories. The bus switch 125 may behave as a set of low-delay FET switches that connects one memory IC or the other to the processor, but not both at the same time. This may cut the capacitive load on the processor bus by almost a factor of two.

MIL-STD-1553B is a 1 megabit/s redundant bus that is commonly used in space systems. As an example, the processor 105 may have a 1553 bus controller, remote terminal, and bus monitor core built into the ASIC hardware. The 1553 core may be wired to pins on the optional MicroTCA Zone 3 connector 130.

The FPGA 120 may provide a platform for custom hardware co-processing functions to reduce the load on the processor ASIC 105. The FPGA 120 may also have built-in physical layer support for high-speed serial, Low-Voltage Differential Signaling (LVDS), I2C, and JTAG (Joint Test Action Group) interfaces. These capabilities may be hard IP blocks instantiated in the FPGA 120 that can be accessed by configurable designs (e.g., soft designs) in the user fabric of the FPGA 120.

In FIG. 1, the blocks labeled IPMB-L and IPMB-0 may be I2C links for management of other cards in the system via the Intelligent Platform Management Interface (IPMI) protocol. The "common options" block may represent the optional high-speed serial protocols supported within the standard, such as Gigabit Ethernet.

Firmware and/or software for the FPGA 120 according to embodiments of the present invention may be capable of interfacing with the nonvolatile memories and provide error detection and correction for sensor or instrument boards 200 (e.g., for SRAM FPGAs of instruments boards). The sensor or instrument boards 200 may be located elsewhere in the payload (e.g., not located within the SBC 100). Sensor boards and instrument boards may be used interchangeably herein.

The SBC 100 may have deep non-volatile memory 115 (e.g., a gigabyte or more of non-volatile memory) that is designed to store configuration data for SRAM-based FPGAs 220 hosted on other boards 200 within the system. The other boards 200 may be located elsewhere in the payload (e.g., not located within the SBC 100). Due to the volatility of their programming memory, these FPGAs 220 may be programmed after power up. The SBC 100 may have hardware, firmware, and software and, during operation, may perform automated error detection and correction for errors found on other modules 200 in the system. Those other modules 200 have SRAM based FPGAs 220 that can develop errors in their programming memory due to radiation-induced single-event effects. For example, FIG. 2 illustrates the programming of SRAM-based FPGAs 220 on sensor boards 200 in the instrument system from local SBC flash memory.

As an example, a Microsemi RTG4™ FPGA may be used. A Microsemi RTG4™ FPGA may support hardware co-processing functions for the GR712RC. The RTG4™ is a radiation-tolerant FPGA that can be reconfigured in-circuit. The RTG4™-150 has 151,000 logic elements, 720 user IOs, 5.3 Mbits of SRAM, and 24 multi-gigabit SerDes. These high-speed SerDes may be used to support the "common-options" lanes defined in the standard for primary communication with other AMC cards in a MicroTCA system. These high-speed lanes support Ethernet, PCI Express, and Serial RapidIO. The RTG4™ may directly support PCI Express endpoints in hardware and support Ethernet and Serial RapidIO at the physical layer. For a PCI Express root complex, Ethernet, and Serial RapidIO, full stacks may be instantiated as IP cores in the fabric.

The FPGA 120 may be mapped into the I/O space of the GR712RC processor 105. The processor 105 may read and write to registers in this I/O space to communicate with the FPGA 120. Using this technique, the FPGA 120 may handle interface functions that would otherwise consume processor bandwidth. VHDL (Very high-speed integrated circuit Hardware Description Language) IP cores for the FPGA 120 may support interfaces such as flash memory interfaces, I2C Interfaces, SpaceWire, and JTAG.

The SBC 100 may provide two 8-gigabit NAND flash parts 115 from 3D-Plus that are radiation-tolerant. The VHDL flash memory controller may allow the processor 105 to easily read and write single bytes (or multiple bytes) from a flash memory, unlike traditional solutions that use a complex sequence of commands to erase, write, and read back entire 4-Kbyte blocks of memory at a time. This way, the processor 105 may interface with the flash memory as though it was an SRAM and the hardware-intensive activity of managing entire block reads and writes may be handled by the FPGA 120. When the processor 105 makes a single-byte write, the FPGA 120 may read the entire 4 Kbyte block into its memory, modify the byte being written, erase the flash block being accessed, and then write the entire block back to flash. This entire operation may be hidden from the processor 105. In this manner, the FPGA 120 may act as a hardware co-processor for flash interactions.

Unlike other forms of non-volatile memory, NAND flash 115 may be shipped from the manufacturer with some blocks that do not work properly. Blocks have additional "spare" bits associated with them that may be used to mark them as bad blocks. Bad blocks can also develop during the lifetime of the memory. Traditional systems set a status bit that indicates to the processor that a requested block is good or bad. According to embodiments of the present invention, a bad-block management scheme that either skips bad blocks or uses a more advanced block replacement method may be used.

Inter-IC (I2C) is a two-wire serial bus protocol that is commonly used for platform management. I2C typically runs at 400 kbit/sec. In MicroTCA, I2C buses may be used for initialization of power modules and AMC cards, to perform simple control, to request board information, and to request board state-of-health data. The I2C master may be instantiated in the FPGA 120 and may be interfaced to the processor 105 through the I/O space like the flash memory controller. The SBC 100 may also be capable of acting as an I2C slave.

As an extension to standard MicroTCA interfaces, an SBC 100 according to embodiments of the present invention may include SpaceWire ports at the backplane and/or the front panel. For example, the SBC 100 may include five SpaceWire ports at the backplane and one at the front panel.

SpaceWire uses LVDS and is natively compatible with MicroTCA backplane standards. The SpaceWire ports may be connected directly to the SpaceWire endpoints that are built into the GR712RC processor via the FPGA's LVDS transceivers or may be connected through a SpaceWire router instantiated in the FPGA.

MicroTCA supports an IEEE 1149.1 (also known as JTAG) interface for each AMC board in the MicroTCA system. These JTAG interfaces may connect from each AMC board to the SBC, which can perform the function of a MicroTCA Carrier Hub. JTAG connections are made on the connector 135 labelled Blade 1 and may be used to configure SRAM-based FPGAs 220 on other cards 200 in the system.

In the space environment, these SRAM-based FPGAs 220 may be scrubbed for bit errors in their configuration memory. VHDL for the SBC's FPGA 120 may configure SRAM-based FPGAs 220 on other AMC cards 200 and detect errors in their programming data. The VHDL may abstract the details of programming the FPGAs 220 over JTAG from the processor 105 and may provide continuous, automated error detection for the SRAM-based FPGAs' 220 programming data without intervention from the processor 105. When a bit error is detected in the configuration memory of an off-board SRAM-based FPGA 220, the processor 105 may receive a maskable interrupt. The processor software which is stored in MRAM 140 can then make a decision on how to handle the error, such as using the JTAG interface to fix the portion of programming data affected by the error.

The SBC 100 may scrub SRAM based FPGAs 220 on the sensor boards 200 by scanning their configuration memory and comparing what it sees in the scan with a set of local checksums. Local checksums may be stored in SRAM 110 and may be derived from information that is stored in the flash memories 115. The local SBC FPGA 120 may do this part of the job (e.g., the scrubbing) autonomously without disturbing the SBC processor 105. In other words, the local SBC FPGA 120 may do this part of the job autonomously without any interaction from the SBC processor 105. If a radiation induced error is discovered on a sensor board SRAM based FPGA 220, the processor 105 may then be notified and the error may be fixed using a known good copy of the configuration from the deep radiation hardened memory on the SBC 100.

In addition to the flash storage 115, the SBC 100 may have two other types of non-volatile memory. The processor boot loader may reside in a 32K×8-bit radiation-hardened programmable read only memory (PROM) 145. Program code may be stored in an 8-Mbyte magneto-resistive RAM (MRAM) 140 and may be copied over to SRAM 110 before execution begins. The MRAM and PROM are 8-bits wide and are buffered by the FPGA 120. The MRAM may have a high capacitive load compared with the FPGA 120. The FPGA 120 may lock or unlock portions of the MRAM to protect program code from being overwritten.

The printed circuit board of the SBC 100 of embodiments of the present invention may be manufactured to the IPC-6012-Class 3 standard and constructed from Isola FR408HR™ laminate.

Further, the SBC 100 of embodiments of the present invention may include JTAG Switch Module (JSM) routing, start-up read only memory (SuROM) 145, and a front panel SpaceWire port.

As shown in FIG. 1, Fabric A may include the clocking and high speed serial interconnect resources available in the AMC environment.

FIG. 3 is a perspective view of a conduction cooled enclosure 300 for a single board computer (SBC) according to an embodiment of the present invention.

According to embodiments of the present invention, the SBC may be housed in a conduction-cooled frame. For example, the conduction cooled frame may be manufactured from 6061-T6 aluminum and may use wedge locks. According to some embodiments of the present invention, the conduction cooled frame may be specifically designed to meet mission specific shock, vibration, and thermal requirements. These requirements typically exceed those published in NASA's General Environmental Verification Standard. A solid model of the conduction cooled frame and cover is shown in FIG. 3.

Table 1 shows the fabric utilization of the FPGA (e.g., a RTG4™ FPGA) according to an embodiment of the present invention. As shown, only 15% of the fabric is utilized. As such, there is room for additional capability to be added to the FPGA.

TABLE 1

| FPGA Fabric Utilization | |
| --- | --- |
| Component | Utilization |
| FLASH Memory Manager | 1% |
| I2C Master | 1% |

TABLE 1-continued

FPGA Fabric Utilization

| Component | Utilization |
| --- | --- |
| JTAG Config. Manager | 3% |
| SpaceWire Router | 10% |
| Total | 15% |

As discussed above, embodiments of the present invention include a single-board computer (SBC) for deployment in space-flight applications. The SBC may meet the command- and data-handling requirements for missions requiring true space-grade radiation hardness and fault tolerance, for example, exceeding those that are typical in CubeSat and SmallSat applications. The SBC according to embodiments of the present invention may have a substantially lower cost, lower power, and smaller form factor than typical space-grade solutions presently available. The SBC according to embodiments of the present invention may use the MicroTCA standard, which is smaller than common 6U-sized solutions but still allows interoperability with a diverse ecosystem of commercial development equipment. The SBC according to embodiments of the present invention may use QMLV or Class-S parts with total-ionizing-dose tolerance appropriate for deployment on long-term missions in MEO or GEO environments.

A relevant device or component (or relevant devices or components) according to embodiments of the present invention described herein may be implemented utilizing any suitable hardware (e.g., an application-specific integrated circuit, FPGA, or DSP), firmware (e.g., VHDL), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, MRAM, PROM, and/or Flash memory. The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A radiation hardened single board computer (SBC) comprising:
   a processor;
   static random-access memory (SRAM);
   non-volatile memory;
   a field programmable gate array (FPGA); and
   board-level physical layer interfaces, wherein the SBC is configured to interface with one or more sensor boards not located within the SBC via the board-level physical layer interfaces, wherein each of the sensor boards comprises an FPGA comprising SRAM programming memory, and
   wherein the FPGA of the SBC is configured to perform automated error detection and correction for errors found in the SRAM programming memory of each of the FPGAs of the one or more sensor boards.

2. The SBC of claim 1, wherein the processor is an application specific integrated circuit.

3. The SBC of claim 1, wherein the FPGA comprises physical layer support for:
   high-speed serial interfaces;
   Low-Voltage Differential Signaling (LVDS) interfaces;
   an Inter-IC (I2C) interface;
   SpaceWire; and
   Joint Test Action Group (JTAG) interfaces.

4. The SBC of claim 1, wherein the FPGA comprises a platform for custom hardware co-processing functions to reduce a load on a processor application-specific integrated circuit (ASIC).

5. The SBC of claim 1, wherein the FPGA is configured to manage entire block reads and writes for flash memory.

6. The SBC of claim 1, wherein the SBC is a payload processor for a set of instruments in Earth orbit applications.

7. The SBC of claim 1, wherein the SBC consumes 6.6 W or less.

8. The SBC of claim 1, wherein the SBC is configured to meet MicroTCA standards.

9. A field programmable gate array (FPGA) of a radiation hardened single board computer (SBC) configured to provide a platform for custom hardware co-processing functions to reduce a load on a processor application-specific integrated circuit (ASIC) of the SBC, the FPGA comprising:
   physical layer support for interfaces,
   wherein the SBC is configured to interface with a sensor board not located within the SBC, and
   wherein the FPGA of the radiation hardened SBC is configured to perform automated error detection and correction for errors found in static random access memory (SRAM) configuration memory of an FPGA of the sensor board.

10. The FPGA of claim 9, wherein the physical layer support comprises support for:
    high-speed serial interfaces;
    Low-Voltage Differential Signaling (LVDS) interfaces;
    an Inter-IC (I2C) interface;
    SpaceWire; and
    Joint Test Action Group (JTAG) interfaces.

11. The FPGA of claim 9, wherein the FPGA is configured to manage entire block reads and writes for flash memory.

12. The FPGA of claim 9, wherein automated error detection and correction comprises:
    detecting, at the FPGA, an error in the programming memory of the SRAM of the FPGA of the sensor board;
    interrupting a processor of the sensor board; and
    fixing, by the processor, the error in the programming memory of the SRAM of the FPGA of the sensor board.

13. The FPGA of claim 12, wherein automated error detection and correction further comprises scrubbing, by the FPGA, the SRAM based FPGA of the sensor board by scanning the programming memory of the SRAM of the FPGA of the sensor board and comparing results of the scan with a set of local checksums.

14. The FPGA of claim 13, wherein the FPGA is configured to perform the scrubbing autonomously without disturbing the processor.

15. The FPGA of claim 12, wherein fixing the error comprises using a known good copy of the programming memory from a deep radiation hardened memory on the SBC.

16. A method of providing error detection and correction by a field programmable gate array (FPGA) and processor of a radiation hardened single board computer (SBC), the error detection and correction being for an instrument board not located within the SBC, the method comprising:
    detecting, at the FPGA, an error in a configuration memory of the instrument board;
    interrupting a processor of the instrument board, by the FPGA, when the error is detected; and
    fixing, by the processor, the error in the configuration memory of the instrument board.

17. The method of claim 16, further comprising scrubbing, by the FPGA, a SRAM based FPGA on the instrument board by scanning the configuration memory of the instrument board and comparing results of the scan with a set of local checksums.

18. The method of claim 17, wherein the FPGA performs the scrubbing autonomously without disturbing the processor of the instrument board.

19. The method of claim 16, wherein fixing the error comprises using a known good copy of the configuration memory from a deep radiation hardened memory on the SBC.

20. A radiation hardened single board computer (SBC) comprising:
    a processor;
    static random-access memory (SRAM);
    non-volatile memory;
    a field programmable gate array (FPGA); and
    board-level physical layer interfaces, wherein the SBC is configured to interface with one or more sensor boards via the board-level physical layer interfaces,
    wherein the FPGA is configured to perform automated error detection and correction for errors found in a plurality of SRAM programming memory of FPGAs of the sensor boards, and
    wherein the SBC consumes 6.6 W or less.

* * * * *